Jan. 3, 1967　　　　W. HELLER　　　　3,296,446
APPARATUS FOR DETERMINING THE SHAPE OF COLLOIDAL
PARTICLES USING LIGHT SCATTERING
Filed Dec. 31, 1963
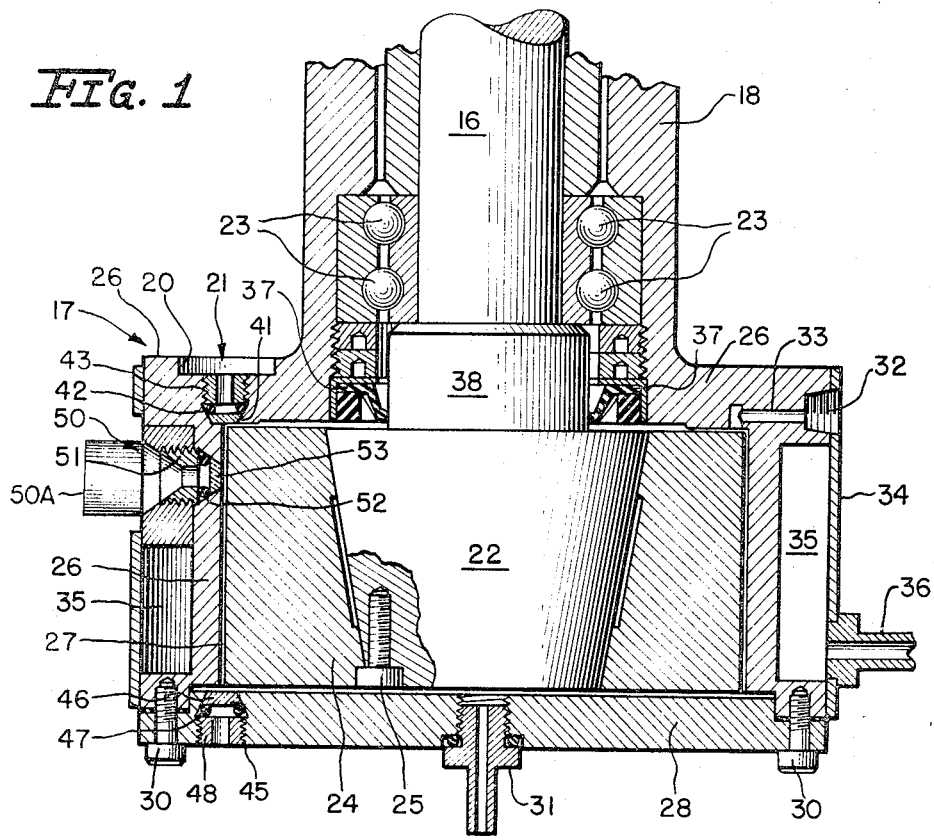
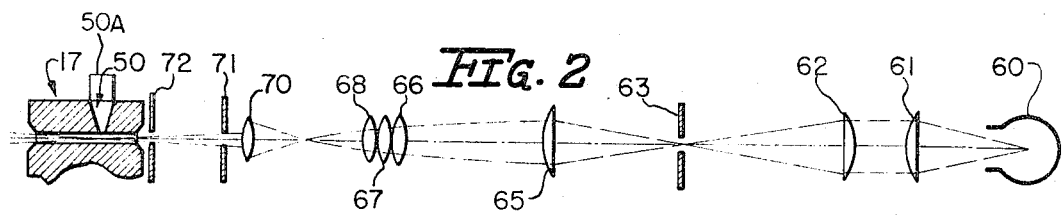
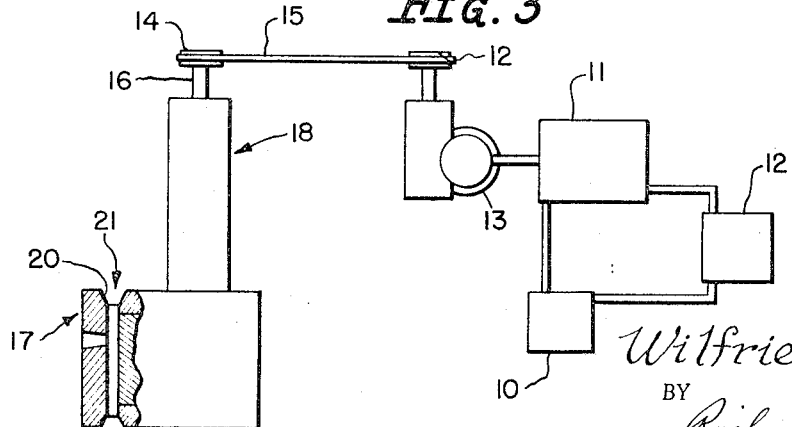
INVENTOR
Wilfried Heller
BY
Richard J. Miller
Atty.

United States Patent Office 3,296,446
Patented Jan. 3, 1967

3,296,446
APPARATUS FOR DETERMINING THE SHAPE OF COLLOIDAL PARTICLES USING LIGHT SCATTERING
Wilfried Heller, Huntington Woods, Mich., assignor, by mesne assignments, to the United States of America as represented by the Secretary of the Navy
Filed Dec. 31, 1963, Ser. No. 334,957
10 Claims. (Cl. 250—218)

This invention relates to the determination of the sizes and shapes of molecules or particles and is concerned more particularly with an apparatus for determining the sizes and shapes of large molecules and of colloidal particles which have a size below about 0.5 micron, the resolving power of a microscope.

The physical behavior of a colloidal or macromolecular system depends largely on the size, shape and molecular weight of the dispersed phase (solute). Therefore, the determination of these properties can be utilized to study the kinetics of aggregation as well as the mechanical properties of polymer molecules.

Currently, there are three methods which give, under certain conditions, information related to that obtainable by the instant invention. There are: electromicroscopy, measurement by streaming birefringence, and measurements of the dissymmetry of light scattering. The electromicroscopy method has the disadvantage of being applicable only to completely dry particles and macromolecules; consequently the determined dimensions may differ from the actual dimensions. Measurement by streaming birefringence has the disadvantage of being dependent on the structural anisotropy of the particles. Finally, measurement of the dissymmetry of light scattering has the disadvantage of being limited to macromolecules whose largest dimension does not exceed roughly one-quarter micron, whereas the present invention is not so limited. Additionally, these methods are far less sensitive to changes in molecular shape then is the present invention.

The present invention is free of the drawbacks noted above and embodies other advantages as will appear.

An object of the invention is to provide a new and improved apparatus for measuring the size and shape of rigid nonspherical colloidal crystals and macromolecules.

Another object of the invention is to provide an improved apparatus for determining the statistical shape of flow-deformed flexible macromolecules.

Still another object is to provide an apparatus for determining particle shapes in a solution including means providing a thin streaming layer of the solution and means directing an intense, substantially parallel radiant energy beam through the streaming solution whereby the particles scatter the radiant energy and means for measuring the intensity of the radiant energy scattered in the plane normal to the incident beam.

Yet another object is to provide an apparatus for determining particle shapes in a solution comprising, means providing a thin layer of the solution, means for imparting streaming movement to the thin layer, means providing an intense incident light beam directed to pass through the streaming thin layer and become scattered by the particles therein, and light responsive means for measurement of the light scattering in a direction normal to the incident beam whereby the size of the particles may be determined.

A further object is to provide an apparatus for determining particle shapes in a solution, comprising, a stationary outer cylinder having a wall, a rotatable inner cylinder coaxially aligned with the outer cylinder, a narrow substantially annular chamber being defined therebetween and containing the solution, streaming movement being imparted to the solution by the inner cylinder when rotating, means for directing an incident substantially monochromatic beam of radiant energy through the streaming solution parallel to the cylinder axes, and radiant energy responsive means in the wall of said outer cylinder whereby measurement of the scattering of the radiant energy in a direction normal to the incident beam may be effected and the particle shape determined.

Other advantages will become apparent on reference to the following description and the accompanying drawings, wherein:

FIG. 1 shows a more or less schematic, partial sectional view of the embodiment of the invention;

FIG. 2 shows a schematic view of an optical system used in connection with the invention; and FIG. 3 is a schematic view depicting an entire system including the present invention.

The shape of rigid nonspherical colloidal crystals and macromolecules and the statistical shape of flow-deformed flexible macromolecules can be determined from either birefringence measurements or light scattering measurements, embodying the present invention, on solutions flowing within the gap between two concentric cylinders. Streaming birefringence measurements are widely in use. The light scattering method of the within invention is considerably more sensitive for determination of the crucial quantity, the extinction angle, the angle which characterizes the orientation of an anisometric particle with respect to the direction of the velocity gradient, from which the shape of the flowing body is derived provided its weight is known from auxiliary measurements. Furthermore, numerical data obtained by use of the present invention are primarily dependent on the shape of the flowing body, the intrinsic anisotropy being of secondary importance. Streaming birefringence on the other hand depends, in its numerical values, very strongly on the anisotropy of the flowing body.

The experimental technique used for the determination of these data is the measurement of the change of the intensity of the light scattered by the colloidal particles when orientated by a velocity gradient.

Referring more particularly to FIG. 3 wherein the entire system is schematically illustrated, a variable, constant speed electronic drive 10 controls a motor 11 which is equipped with a tachometer feed-back mechanism 12. Motor 11 is connected to the driving pulley 12 through suitable gear reduction 13, whence power to the rotor pulley 14 is transmitted through belt 15. Pulley 14 is connected to a spindle 16 which is mounted for rotative movement in the housing portion 17 of the outer cylinder or stator, designated generally as 18. As indicated, the stator 18 and housing 17 are vertically orientated and are provided with suitable mounting means (not shown) to prevent vibration. As will be more fully described subsequently an optical system is provided to direct an incident beam of radiation through aperture 20 as shown pictorially by arrow 21. In one embodiment motor 11 comprised a one-third horsepower, 1725 r.p.m. gearhead motor having a minimum speed of approximately 50 r.p.m. The feedback mechanism 12 was rated to give a speed regulation of one-half percent at all speeds, the gear reduction units and pulley units providing an overall ratio of motor speed to spindle speed of 3.5 to 1. However, any suitable motor and transmission might be used as long as a substantially constant and relatively vibrationless movement were transmitted to spindle 16.

Referring more particularly to FIGURE 1, spindle 16 is seen to have an enlarged downwardly tapering end portion 22 and is coaxially mounted in stator 17 for rotative movement on suitable bearings 23 in housing 18. An inner cylinder or rotor 24 is fixedly secured or interfitted about tapered end portion 22 in a suitable manner such as by bolt 25. Outer cylinder 17 has an annular wall 26 whose inner edge, along with the outer edge of rotor 24, defines an annular gap or space 27 into which the dispersed phase test solution is placed. An end plate 28 is removably secured, as by fasteners 30, to outer cylinder 17 and provides for replacement of rotors and cleaning of the unit. Preferably, an opening 31 is provided in plate 28 to facilitate charging the gap 27 with the test solution. Also, an outlet 32 is provided in wall 26 and is in communication with the extreme upper portion of gap 27 by means of passageway 33 for discharging overflow or excessive test solution. Preferably, stator 17 is provided with an outer jacket 34 which forms a chamber 35 for the circulation of cooling fluid through a conduit 36. A suitable seal 37 is provided at collar portion 38 of spindle 16 and is composed, preferably, of neoprene when aqueous solutions are being tested, and of Teflon for the testing or organic solutions.

It is seen that aperture 20 is preferably stepped and provided with a transparent viewing means 41, such as a window constructed preferably of optical glass, held in place by a suitable sealing means such as O-ring 42 and tubular fastener 43.

A second aperture 45 is provided opposite aperture 20 and is similarly constructed having a window 46, an O-ring 47 and a tubular screw 48. The incident beam enters through aperture 20, passes along the space 27 and exits through aperture 45. To permit measurement of the scattered intensity of the solute a lateral opening 50 is provided in stator 17. Tubular screw 51 and O-ring 52 bear an optical window 53 and keep it in place. Radiant energy responsive means such as a photoelectric cell 50A may be positioned at lateral opening 50 to make the necessary measurements. Thus, the incident beam, as indicated at 21, passes through space 27 and is scattered by the particles in the test solution. The scattering is related to the orientation of the particles in the solution caused by the streaming movement. Observations are made in the plane normal to the incident beam and containing the velocity gradient. Since the space 27 is small compared to the radius of the rotor 24 the velocity gradient may be considered as constant across space 27 and is given by the expression $G = \pi RN/30d$ where R is the radius of rotor 24, $d$ is the width of space 27 and N is the r.p.m. of rotor 24. For accuracy, the flow of the solution must be laminar and the critical speed of the rotor is reached when the flow becomes turbulent. This critical speed is proportional to the viscosity of the test solution, varies with the width of space 27 and may be calculated by known formulae.

Referring now to FIG. 2, there is shown a schematic version of an optical system developed to practice the present invention. A light source 60 provides the incident beam of high intensity and relative stability. Preferably, light source 60 is an AH-6 Mercury arc lamp which is jacketed for water cooling. Lenses 61 and 62 represent a collimating unit consisting, preferably, of two plano-convex lenses which deliver a substantially parallel and well defined beam to the space 27. Preferably, to avoid stray light at the lateral opening 50 the incident beam has a very small cross section (less than 3 mm. by 0.3 mm.). The image of the source 60 is defined by an adjustable slit 63 and there is also provided an auxiliary collimating lens 65. Suitable interference filters (not shown) may be properly inserted in the optical system to isolate the particular wave length of light desired. Lenses 66, 67 and 68 comprise a microscopic objective group and lens 70 represents an additional low power microscope objective. Diaphragms 71 and 72 are finally provided to produce the necessary parallelism of the incident beam. This is accomplished by adjusting diaphragm 71 to its optimum opening determined by the space 27. (Several sized rotors 24 were available, the space 27 dimension ranging from 0.2 to 0.8 mm.) Second diaphragm 72 is provided, preferably, to eliminate undesirable stray light caused by first diaphragm 71.

Thus, a monochromatic, quasi-parallel incident beam of intense light is directed through space 27. The moving rotor 24 has imparted streaming movement to the test solution in said space 27. The colloidal particles in the solution are preferentially oriented by virtue of being subjected to a velocity gradient. Measurement of the extinction angle as a function of the velocity gradient, by determining the intensity of the light scattered in a plane normal to the incident beam secures the size and shape of the colloidal particles whose weight has been derived from standard, auxiliary measurements.

It should be noted that the apparatus of the present invention may be modified so as to permit ordinary streaming birefringence measurements also, although this does not comprise any portion of the invention.

Obviously, many modifications and variations of the present invention are possible in the light of the above teachings. It is therefore to be understood that within the scope of the appended claims the invention may be practiced otherwise than as specifically described.

1. An apparatus for determining particle shapes in a solution comprising:
  (a) means providing a single thin layer of the solution;
  (b) means for imparting rotary streaming movement to said thin layer;
  (c) means providing an intense incident radiant energy beam directed to pass through said thin layer and become scattered by the particles therein; and
  (d) viewing means permitting observation of the radiant energy scattering in a direction normal to the incident beam whereby the shape of said particles may be determined.

2. An apparatus for determining particle shapes in a solution comprising:
  (a) means providing a single thin layer of the solution;
  (b) means for imparting rotary streaming movement to said thin layer;
  (c) means providing an intense incident radiant energy beam directed to pass through said streaming thin layer and become scattered by the particles therein; and
  (d) radiant energy responsive means for measurement of the radiant energy scattering in a direction normal to the incident beam whereby the size of said particles may be determined.

3. An apparatus for determining particle shapes in a solution, comprising:
  (a) means providing a single thin layer of the solution;
  (b) means for imparting rotary streaming movement to said thin layer;
  (c) means providing an intense incident light beam directed to pass through said streaming thin layer and become scattered by the particles therein; and
  (d) light responsive means for measurement of the light scattering in a direction normal to the incident beam whereby the size of said particles may be determined.

4. An apparatus for determining particle shapes in a solution, comprising:
  (a) a stationary outer cylinder having a wall;
  (b) a rotatable inner cylinder coaxially aligned with said outer cylinder;
  (c) a narrow substantially annular chamber being defined therebetween and containing the solution, streaming movement being imparted to the solution by the inner cylinder when rotating;
  (d) means for directing an incident substantially monochromatic beam of radiant energy through said streaming solution parallel to the cylinder axes; and
  (e) transparent viewing means in the wall of said outer cylinder whereby measurement of the scattering of the radiant energy in a plane normal to the incident beam may be effected and the particle shape determined.

5. An apparatus for determining particle shapes in a solution, comprising:
(a) a stationary outer cylinder having a wall;
(b) a rotatable inner cylinder coaxially aligned with said outer cylinder;
(c) a narrow substantially annular chamber being defined therebetween and containing the solution, streaming movement being imparted to the solution by the inner cylinder when rotating;
(d) means for directing an incident substantially monochromatic beam of radiant energy through said streaming solution parallel to the cylinder axes; and
(e) radiant energy responsive means in the wall of said outer cylinder whereby measurement of the scattering of the radiant energy in a direction normal to the incident beam may be effected and the particle shape determined.

6. The apparatus of claim 1 wherein said thin layer providing means and said streaming movement imparting means define a gap through which said radiant energy beam passes along a given path.

7. The apparatus of claim 2 wherein said thin layer providing means and said streaming movement imparting means define a gap through which said radiant energy beam passes along a given path.

8. The apparatus of claim 3 wherein said thin layer providing means and said streaming movement imparting means define a gap through which said light beam is directed.

9. An apparatus for determining particle size in a solution, comprising:
(a) an annular housing having an inner radius;
(b) an inner rotatable annular member having an outer radius, wherein said inner radius is greater than said outer radius by a given amount; said inner member being rotatable with respect to said annular housing;
(c) first and second closure members affixed to said annular housing and defining with said annular housing and said inner annular member a gap;
(d) a solution in said gap;
(e) means coupled to said inner annular member for rotating said inner annular member to impart a streaming motion to said solution such as to distribute particles in said solution uniformly throughout said solution in said gap;
(f) radiant energy beam directed through said solution in said gap;
(g) means in said first and second closure members to allow said beam to pass through said solution;
(h) viewing means in said outer annular member;
(i) radiant energy sensing means positioned adjacent said viewing means to sense energy scattered from said solution normal to said beam.

10. The apparatus of claim 9 wherein means are provided in said apparatus to continuously supply solution to said gap.

References Cited by the Examiner

UNITED STATES PATENTS

| | | | |
|---|---|---|---|
| 1,807,659 | 6/1931 | Grant | 88—14 |
| 2,626,361 | 1/1953 | Martine | 250—218 |
| 2,775,159 | 12/1956 | Frommer | 250—222 |
| 2,873,644 | 2/1959 | Kremen et al. | 250—218 |
| 3,074,627 | 1/1963 | Goetz | 73—432 |
| 3,084,591 | 4/1963 | Stevens | 73—432 |

RALPH G. NILSON, *Primary Examiner.*

M. ABRAMSON, *Assistant Examiner.*